Sept. 6, 1927.

H. D. GEYER

LIQUID LEVEL INDICATOR

Filed May 9, 1923

Witnesses

Inventor.
Harvey D. Geyer
By
his Attorney.

Sept. 6, 1927.  H. D. GEYER  1,641,380
LIQUID LEVEL INDICATOR
Filed May 9, 1923   2 Sheets-Sheet 2

Witnesses.

Inventor.
Harvey D. Geyer
By
Ralph K. Chilton
his Attorney

Patented Sept. 6, 1927.

1,641,380

UNITED STATES PATENT OFFICE.

HARVEY D. GEYER, OF DAYTON, OHIO, ASSIGNOR TO DAYTON-WRIGHT COMPANY, OF DAYTON, OHIO, A CORPORATION OF DELAWARE.

LIQUID-LEVEL INDICATOR.

Application filed May 9, 1923. Serial No. 637,835.

This invention relates to a liquid level indicator for liquid within a tank.

An object of this invention is to provide a very simple and efficient form of indicator means which functions uniformly and is very unlikely to get out of order.

Another object is to provide an indicator means which may be located on the under side of a tank and yet have the tank sealed to prevent all possibility of leakage at the point of attachment of the indicator.

Further objects and advantages of the present invention will be apparent from the following description, reference being had to the accompanying drawings wherein a preferred form of the present invention is clearly shown.

In the drawings.

Similar reference numerals refer to similar parts throughout the several views.

Figure 1:
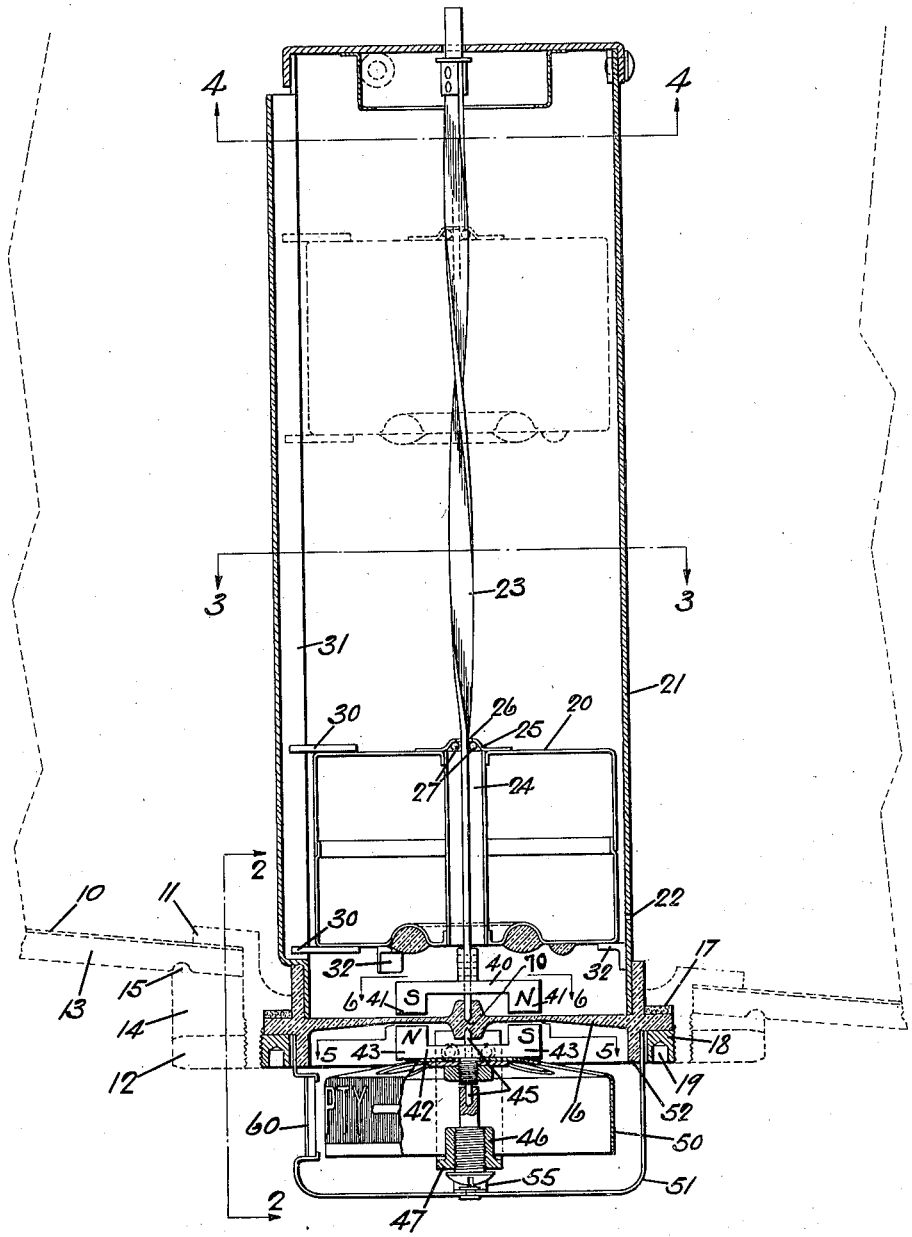
Fig. 1 shows a vertical section through the entire indicator mechanism, the tank to which it is applied being shown in dotted lines.

The bottom of the tank is indicated by numeral 10. A round hole is cut through the bottom 10 and a flanged and shouldered bushing 11 inserted therein and clamped securely to the bottom 10 by means of a ring nut 12. The tank shown in the drawings is one especially designed as a fuel tank to be placed in the wing of an airplane and hence is covered with a rubberized covering 13 and has a slanting or irregular bottom as shown. The irregular shaped washer or ring 14 is provided with a circular bead 15 which bears into the rubber covering 13 when the nut 12 is tightened and forms an effective seal against leakage. Of course any other suitable form of gasket or packing could be used.

The base 16 of the indicator mechanism and the gasket 17 is clamped against the shoulder of the bushing 11 by the ring nut 18 and so completely seals the bottom of the tank against possibility of leakage. The nut 18 may be provided with holes 19 for the application of a spanner wrench.

Figure 3:
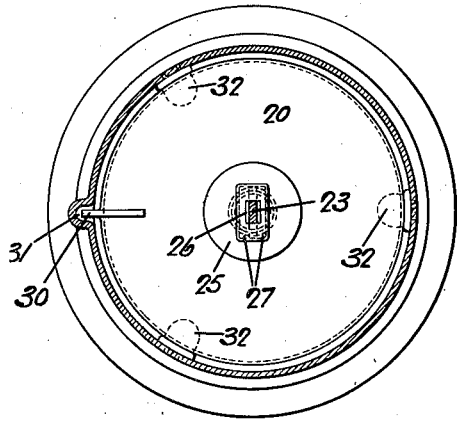
Fig. 3 is a section on line 3—3 of Fig. 1.
Figure 2:
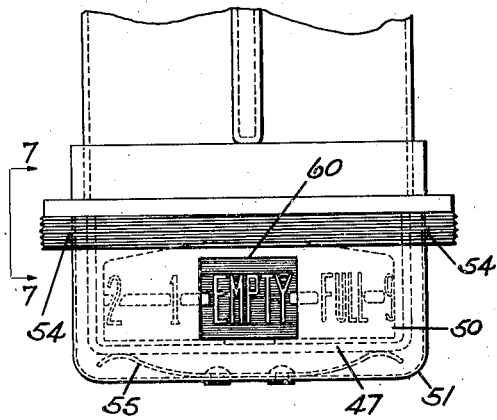
Fig. 2 is a side elevation of a part of the mechanism showing the peep hole for reading the indicator.
Figure 4:
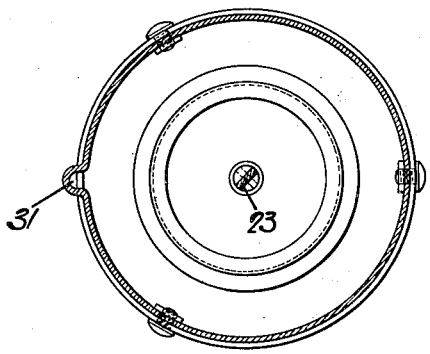
Fig. 4 is a section on line 4—4 of Fig. 1.
Figure 6:
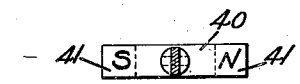
Fig. 6 is a section on line 6—6 of Fig. 1.

The float 20 rides up and down on the surface of the liquid within the fixed cylinder 21 which is suitably mounted above the base 16, a hole 22 being provided therein to permit the liquid level within cylinder 21 to be the same as the liquid level in the tank. A spiral ribbon 23 extends through an opening 24 through float 20 and is rotatably mounted within cylinder 21 upon a suitable needle point bearing 70 at its lower end so that it is freely rotatable with a minimum amount of friction. The opening 24 of float 20 is provided with a cover plate 25 having a slot 26 therein through which ribbon 23 extends and in which the ribbon is freely slidable but held against relative rotation with float 20. If desired, two antifriction bearing members 27 of some hard substance such as agate may be provided at the sides of slot 26 to reduce friction and prevent binding between the ribbon 23 and float 20. Float 20 is freely movable up and down within cylinder 21 but is held against rotation by means of two pins 30 attached thereto and which slide up and down within the vertical groove or guide 31 (see Fig. 3). It is obvious that as float 20 is raised or lowered on the surface of the liquid the slot 26 through which ribbon 23 extends will cause the ribbon to revolve, since the ribbon is rotatably mounted and the float is not. The ribbon 23 is preferably given such a pitch that it will make one complete revolution from the bottommost position of the float, that is, when the tank is empty, to the topmost position of the float, that is, when the tank is full. Suitable stops 32 may be provided to take the weight of the float 20 at its lower limit.

A magnet 40 having two poles 41 adjacent to and facing the base 16, is rigidly attached to the rotatable ribbon 23. On the under side of the base 16 there is rotatably mounted on bearings 45 a second magnet 42 having its poles 43 facing the poles 41 and separated therefrom only by very narrow air gaps and the small thickness of base 16. Of course base 16 should be of brass or other non-magnetic material so that the flux circuit around through the two magnets 40 and 42 will not be interfered with.

It will be obvious to those skilled in the art that the magnet 42, which is freely rotatable, will be dragged around by the magnetic flux so that its poles 43 lie directly opposite the poles 41. An indicator drum 50 is rigidly attached by any suitable means to magnet 42 and is rotatable therewith. Preferably drum 50 is of thin aluminum or other light material so that the friction upon the bearings 45 will be very small and hence permit magnet 42 to always take an exactly aligned position with magnet 40. If desired the magnets 40 and 42 may be made of sufficient size and strength to lift the weight of the drum 50 and magnet 42, in which case the bearings 45 will act only as guides and hence present only a very small amount of friction. The lower bearing 45 is supported upon a boss 46 on the U-shaped strap 47 which extends around the outside of drum 50 and is rigidly fastened by suitable means to the stationary base 16.

Figure 7:
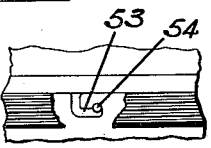
Fig. 7 is a view on line 7—7 of Fig. 2 with parts broken away to show the means for attaching the indicator drum cover in position.
Figure 5:
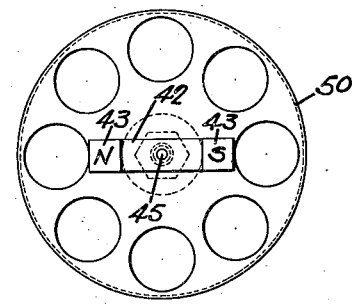
Fig. 5 is a top view of the indicator drum and the magnetic means attached thereto as indicated by line 5—5 of Fig. 1.

A cup shaped cover 51 for drum 50 fits snugly up around a depending flange 52 on the base 16 and is secured in place by the angular slots 53 in its upper edge engaging with the lugs 54 on the flange 52 (see Fig. 7). A spring 55 presses against the strap 47 and so presses cover 51 downwardly to prevent disengagement of lugs 54 and slots 53. The cover 51 is provided with a suitable peephole or transparent window 60 through which the indicia on drum 50 may be observed. Since magnet 40 makes one complete revolution during the travel of float 20 from its full tank position to its empty tank position it will be clear from the foregoing that drum 50 will also make one complete revolution during this time. By suitably marking the periphery of drum 50 the position of the liquid level in the tank will be indicated at all times.

If desired, instead of having both magnets 40 and 42 permanent magnets, either one may be a permanent magnet while the other may be a piece of soft iron of high permeability. The attraction between the two would still cause both to be aligned with each other at all times provided the friction at bearings 45 is quite small. Therefore, the terms magnet or magnetic means in the claims is intended to mean either a permanent magnet or an easily magnetized member which has the characteristics of the magnet after being magnetized.

While the form of embodiment of the invention as herein shown and described constitutes a preferred form, it is to be understood that other forms might be adopted, all coming within the scope of the claims which follow.

What I claim is as follows:

1. A liquid level indicator for a tank including, a float movable with changes in the liquid level, magnetic means located within the tank adjacent its bottom surface, means rotatable by the movement of the float for actuating the magnetic means, and a second magnetic means located without the tank but adjacent to and directly below said first magnetic means whereby said second magnetic means is also rotatable by the movement of the float, said second magnetic means being also attracted against gravity action by said first magnetic means whereby it is rendered more easily rotatable.

2. A liquid level indicator for a tank including, a float movable with changes in the liquid level, magnetic means located within the tank adjacent its bottom surface, means rotatable by the movement of the float for actuating the magnetic means, a second magnetic means located without the tank but adjacent said first magnetic means whereby said second magnetic means is also rotatable by the movement of the float, and a rotatable indicator means attached to said second magnetic means, said indicator and second magnetic means being so mounted as to be attracted against gravity action by said first magnetic means whereby said indicator is rendered more easily rotatable.

In testimony whereof I hereto affix my signature.

HARVEY D. GEYER.